(12) United States Patent
Wang et al.

(10) Patent No.: US 11,796,687 B2
(45) Date of Patent: Oct. 24, 2023

(54) METHOD AND APPARATUS FOR LOCATION DETERMINATION USING PLATE TECTONICS MODELS

(71) Applicant: QUALCOMM Incorporated, San Diego, CA (US)

(72) Inventors: Min Wang, Tustin, CA (US); Ning Luo, Cupertino, CA (US); Gengsheng Zhang, Cupertino, CA (US); Yuxiang Peng, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/165,999

(22) Filed: Feb. 3, 2021

(65) Prior Publication Data
US 2022/0244406 A1 Aug. 4, 2022

(51) Int. Cl.
*G01S 19/41* (2010.01)
*G01S 19/05* (2010.01)
*G01S 19/07* (2010.01)
*G01S 5/02* (2010.01)
(Continued)

(52) U.S. Cl.
CPC ............ *G01S 19/41* (2013.01); *G01S 5/0236* (2013.01); *G01S 5/0244* (2020.05); *G01S 19/05* (2013.01); *G01S 19/071* (2019.08); *G01S 19/43* (2013.01); *G01V 1/282* (2013.01)

(58) Field of Classification Search
CPC .......... G01S 19/04; G01S 19/05; G01S 19/07; G01S 19/071; G01S 19/41; G01S 19/43; G01S 5/0236; G01S 5/0244; G01V 1/282
See application file for complete search history.

(56) References Cited

U.S. PATENT DOCUMENTS

2005/0001763 A1* 1/2005 Han .................. G01S 19/44
342/357.44
2011/0305260 A1* 12/2011 McManus ............ G01S 19/071
375/E1.001
(Continued)

FOREIGN PATENT DOCUMENTS

KR 2015012754 A * 2/2015 ............. H04W 4/06
KR 2019139084 A * 12/2019 ............. H04W 4/06

OTHER PUBLICATIONS

Angular velocity. (1992). Academic Press Dictionary of Science and Technology (4th ed.). Elsevier Science & Technology. Credo Reference: https://search.credoreference.com/content/entry/apdst/angular_velocity/0 (Year: 1992).*

*Primary Examiner* — Bernarr E Gregory
*Assistant Examiner* — Fred H Mull
(74) *Attorney, Agent, or Firm* — Thien T. Nguyen

(57) ABSTRACT

Techniques are provided for applying plate tectonic model information to improve the accuracy of base station assisted satellite navigation systems. An example method for determining a location of a mobile device includes receiving base station measurement, coordinate and epoch information, receiving base station velocity information, receiving signals from a plurality of satellite vehicles, and determining the location of the mobile device based on the signals received from the plurality of satellite vehicles, the base station measurement, coordinate and epoch information, and the station velocity information.

28 Claims, 10 Drawing Sheets

(51) Int. Cl.
*G01V 1/28* (2006.01)
*G01S 19/43* (2010.01)

(56) References Cited

U.S. PATENT DOCUMENTS

| | | | | |
|---|---|---|---|---|
| 2012/0046863 | A1* | 2/2012 | Hope | B64G 3/00 |
| | | | | 701/531 |
| 2014/0292567 | A1* | 10/2014 | Feldhaus | G01S 19/07 |
| | | | | 342/357.4 |
| 2014/0347217 | A1* | 11/2014 | McClure | G01S 19/13 |
| | | | | 342/357.51 |
| 2015/0168560 | A1* | 6/2015 | Ralphs | G01S 19/14 |
| | | | | 701/23 |
| 2017/0212247 | A1* | 7/2017 | Chen | G01S 19/41 |
| 2018/0192233 | A1* | 7/2018 | Del Regno | G01S 19/071 |

* cited by examiner

METHOD AND APPARATUS FOR LOCATION DETERMINATION USING PLATE TECTONICS MODELS

BACKGROUND

The location of a mobile device, such as a cellular telephone, an Internet of Things (IoT) device, a location tracking device, or other such mobile devices including radio communication modules and motion sensors may be useful for a number of applications such as emergency calls, navigation, direction finding, asset tracking, and Internet services. The location of an IoT device may be estimated based on information gathered from various systems such as terrestrial radio transceivers, global navigation satellite system (GNSS) receivers and other sensors. The accuracy of a GNSS based system may often be below the requirements for applications such as land surveying, autonomous land and aerial vehicle navigation, or other location sensitive technologies. Some technologies such as precise point positioning (PPP), real-time kinematic (RTK), and differential GNSS (DGNSS) positioning may be used to enhance the positioning accuracy of GNSS based systems. These technologies are often provided as a subscription service and may utilize other terrestrial based location information to improve the accuracy of position estimates.

SUMMARY

An example method for determining a location of a mobile device according to the disclosure includes receiving base station measurement, coordinate and epoch information, receiving base station velocity information, receiving signals from a plurality of satellite vehicles, and determining the location of the mobile device based on the signals received from the plurality of satellite vehicles, the base station measurement, coordinate and epoch information, and the base station velocity information.

Implementations of such a method may include one or more of the following features. The base station velocity information may be based at least in part on a pole location and an angular velocity obtained from a plate tectonic model. The base station measurement, coordinate and epoch information may be included in one or more Radio Technical Commission for Maritime (RTCM) messages in a RTCM port stream. The base station velocity information may be included in a Radio Technical Commission for Maritime (RTCM) message. The base station velocity information may be received from a server. The base station velocity information may be received from a base station in a Real-Time Kinematic (RTK) positioning system. The base station velocity information may be received from a base station in a Differential Global Navigation Satellite System (DGNSS). At least one of the base station measurement, coordinate information, epoch information, the base station velocity information, or any combinations thereof may be received from a user equipment via a sidelink communication protocol. At least one of the base station measurement, coordinate information, epoch information, the base station velocity information, or any combinations thereof may be received from a base station via a cellular radio access technology. The signals from the plurality of satellite vehicles may be global positioning system signals.

An example method for determining a location of a mobile device according to the disclosure includes obtaining plate tectonic model information, receiving base station measurement, coordinate and epoch information, determining an updated base station location based at least in part on the plate tectonic model information and the epoch information, receiving signals from a plurality of satellite vehicles, and determining the location of the mobile device based on the signals received from the plurality of satellite vehicles, the base station measurement information, and the updated base station location.

Implementations of such a method may include one or more of the following features. The plate tectonic model information may include at least a pole location and an angular velocity. The base station measurement, coordinate and epoch information may be included in one or more Radio Technical Commission for Maritime (RTCM) messages in a RTCM port stream. The plate tectonic model information may be included in a Radio Technical Commission for Maritime (RTCM) message. The plate tectonic model information may be received from a server. The plate tectonic model information may be received from a base station in a Real-Time Kinematic (RTK) positioning system. The plate tectonic model information may be received from a base station in a Differential Global Navigation Satellite System (DGNSS). At least one of the base station measurement, coordinate information, epoch information, the plate tectonic model information, or any combinations thereof may be received from a user equipment via a sidelink communication protocol. At least one of the base station measurement, coordinate information, epoch information, the plate tectonic model information, or any combinations thereof may be received from a base station via a cellular radio access technology. The signals from the plurality of satellite vehicles may be global positioning system signals.

An example apparatus according to the disclosure includes a memory, at least one transceiver, at least one processor communicatively coupled to the memory and the at least one transceiver, and configured to receive base station measurement, coordinate and epoch information, receive base station velocity information, receive signals from a plurality of satellite vehicles, and determine a location of the apparatus based on the signals received from the plurality of satellite vehicles, the base station measurement, coordinate and epoch information, and the base station velocity information.

An example apparatus according to the disclosure includes a memory, at least one transceiver, at least one processor communicatively coupled to the memory and the at least one transceiver, and configured to obtain plate tectonic model information, receive base station measurement, coordinate and epoch information, determine an updated base station location based at least in part on the plate tectonic model information and the epoch information, receive signals from a plurality of satellite vehicles, and determine a location of the apparatus based on the signals received from the plurality of satellite vehicles, the base station measurement information, and the updated base station location.

Items and/or techniques described herein may provide one or more of the following capabilities, as well as other capabilities not mentioned. A RTK system may include a base station and one or more roving devices. The location coordinates of the base station may be based on measurements obtained during a prior epoch. Movement of the base station due to tectonic motion may impact the accuracy of positioning calculations in subsequent epochs. The base station or the rover stations may utilize tectonic model information to update the location coordinates of the base station to the current epoch. The updated base station location information may improve the computed positions of rovers in a RTK system. Further, it may be possible for an effect noted above to be achieved by means other than that noted, and a noted item/technique may not necessarily yield the noted effect.

DETAILED DESCRIPTION

Figure 1:
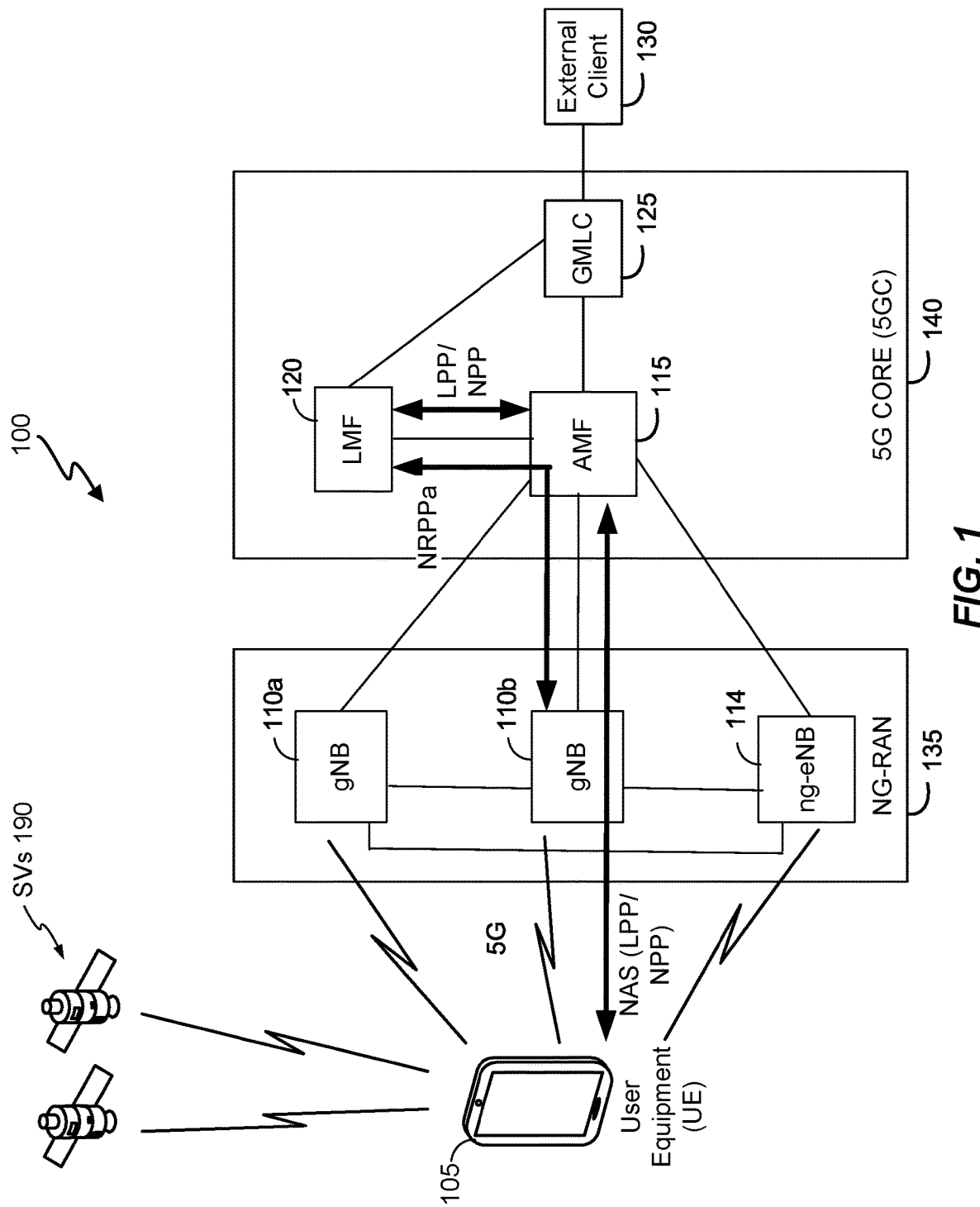
FIG. 1 is a diagram of an example communication system.

Techniques are discussed herein for applying plate tectonic model information to reduce positioning inaccuracies due to variations in base station coordinate epochs. Precise Positioning Services (PPS) usually refers to sub-meter to centimeter level accuracy positioning services, such as Differential GNSS (DGNSS), Precise Point Positioning (PPP), and Real-Time Kinematic (RTK) methods. PPP methods may be enabled via the use of precise orbit and time/clock information using undifferenced measurements from a rover device (i.e., without the use of a local base station). Differential techniques, such as DGNSS, RTK, network RTK, etc., utilize a base station with a known location and obtain measurement differentials between a base station and rover devices. Thus, the accuracy of the resulting position computations are dependent on the accuracy of the base station location.

In general, DGNSS such as DGPS utilizes code-based positioning for determining a location of a GPS receiver. For example, a GPS signal from a satellite transmits Pseudo Random Code (PRC), and a GPS receiver is configured to receive the PRC from multiple satellites. The receiver is configured to align the received code to its own and calculate the propagation delay. The GPS receiver also knows the position of the satellite and can calculate the distance to the satellite. Once the receiver knows its distance (range) from four satellites, for example, it may determine its 3-dimensional position. Once the receiver further receives the DGNSS correction from base station, its positioning accuracy could be further improved, because after applying the DGNSS correction, the impact from satellite orbit and clock inaccuracy and atmospheric error will be effectively reduced.

RTK systems utilize carrier-based ranging to determine position information. For example, a range may be calculated by determining the number of carrier cycles between the RTK receiver and satellite and then multiplied by the wavelength of the carrier signal. In RTK, by using the carrier phase measurement which is much more accurate than PRC, receiver is able to achieve centimeter level positioning accuracy.

DGNSS and RTK may use a base station with a known position (e.g., based on a precise positioning service obtained in an epoch). The base station of the DGNSS system may be configured to compare its known position with the position calculated by the GNSS signal. The differences between known and calculated positions are then transmitted to other receivers in a network, which use the correction to calculate their respective positions. The base station in a RTK system may be configured to transmit the phase of the signal that it observes and send that information to the other receivers in a network, which then compare the information to the phase that they observe. Typically, the base station coordinates are transmitted to the roving stations via a RTCM protocol compatible payload (Radio Technical Commission for Maritime) or other wireless protocol. The bias and/or inaccuracy values will be used to determine the device position solution in differential mode (DGNSS/RTK). In an example, the transmitted values may be accurate, but the datum and reference epochs for the base station may be different. When reference epochs are different, a plate tectonic model may be utilized to improve the position accuracy.

Referring to FIG. 1, a diagram of an example communication system 100 is shown. The communication system 100 comprises a mobile device (e.g., an IoT device, location tracker device, cellular telephone, a roving device, or other user equipment (UE)) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The communication system 100 may utilize information from satellite vehicles (SVs) 190 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and next generation eNodeB (ng-eNB) 114, and the 5GC 140 includes an Access and Mobility Management Function (AMF) 115, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the LMF 120, and the GMLC 125 are communicatively coupled to each other, and the GMLC is communicatively coupled to an external client 130.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs 190, gNBs 110a-b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), Vehicle-to-everything (V2X) networks, etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UNITS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a-b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, DGNSS, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position. In an embodiment, the base stations may be configured to perform the function of a base station in a RTK or DGNSS system. For example, the gNBs 110*a*, 110*b* may be configured to provide coordinate and measurement differential information via RTCM messages.

Figure 2:
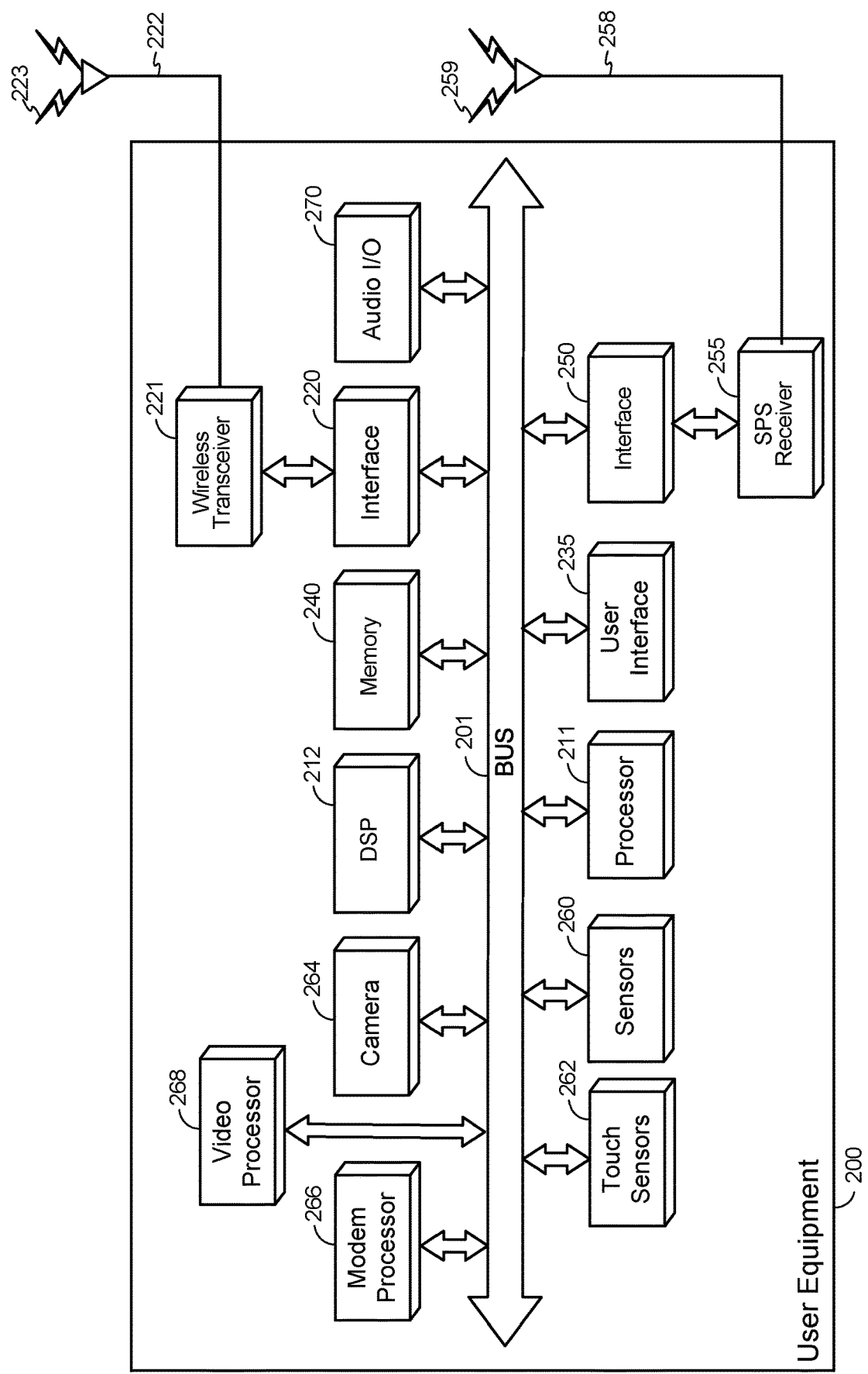
FIG. 2 is a schematic diagram of a mobile device.

Referring to FIG. 2, a schematic diagram of a mobile device 200 according to an embodiment is shown. The UE 105 as shown in FIG. 1 may comprise one or more features of the mobile device 200 shown in FIG. 2. Some of the features disclosed in FIG. 2 are optional. In certain embodiments, the mobile device 200 may comprise a wireless transceiver 221 which is capable of transmitting and receiving wireless signals 223 via a wireless antenna 222 over a wireless communication network. A wireless transceiver 221 may be connected to a bus 201 by a wireless transceiver bus interface 220. The wireless transceiver bus interface 220 may, in some embodiments, be at least partially integrated with the wireless transceiver 221. Some embodiments may include multiple wireless transceivers 221 and wireless antennas 222 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth®, RTCM, and a 5G or NR radio interface defined by 3GPP, just to name a few examples. In a particular implementation, the wireless transceiver 221 may receive and acquire a downlink signal comprising a terrestrial positioning signal such as a PRS. For example, the wireless transceiver 221 may process an acquired terrestrial positioning signal sufficiently to enable detection of timing of the acquired terrestrial positioning signal.

The mobile device 200 may comprise an SPS receiver 255 capable of receiving and acquiring SPS signals 259 via an SPS antenna 258 (which may be the same as the antenna 222 in some embodiments). The SPS receiver 255 and interface 250 may process, in whole or in part, the acquired SPS signals 259 for estimating a location of the mobile device 200. One or more general-purpose processor(s) 211, a memory 240, one or more digital signal processor(s) (DSP(s)) 212, and/or specialized processors (not shown) may be utilized to process acquired SPS signals, in whole or in part, and/or to calculate an estimated location of the mobile device 200, in conjunction with the SPS receiver 255. Storage of SPS, TPS or other signals (e.g., signals acquired from the wireless transceiver 221) or storage of measurements of these signals for use in performing positioning operations may be performed in the memory 240 or registers (not shown). The general-purpose processor(s) 211, the memory 240, the DSP(s) 212, and/or specialized processors may provide or support a location engine for use in processing measurements to estimate a location of the mobile device 200. For example, the general-purpose processor(s) 211 or the DSP(s) 212 may process a downlink signal acquired by the wireless transceiver 221 to, for example, make measurements of RSSI, RTT, AOA, TOA, RSTD, RSRQ and/or RSRQ.

Also shown in FIG. 2, the DSP(s) 212 and the general-purpose processor(s) 211 may be connected to the memory 240 through bus the 201. A particular bus interface (not shown) may be integrated with the DSP(s) 212, the general-purpose processor(s) 211, and the memory 240. In various embodiments, functions may be performed in response to execution of one or more machine-readable instructions stored in the memory 240 such as on a computer-readable storage medium, such as RANI, ROM, FLASH, or disc drive, just to name a few examples. The one or more instructions may be executable by the general-purpose processor(s) 211, specialized processors, or the DSP(s) 212. The memory 240 may comprise a non-transitory, processor-readable memory and/or a computer-readable memory that stores software code (programming code, instructions, etc.) that are executable by the processor(s) 211 and/or the DSP(s) 212 to perform functions described herein.

Also shown in FIG. 2, a user interface 235 may comprise any one of several devices such as, for example, a speaker, microphone, display device, vibration device, keyboard, touch screen, just to name a few examples. In a particular implementation, the user interface 235 may enable a user to interact with one or more applications hosted on the mobile device 200. For example, devices of the user interface 235 may store analog and/or digital signals on the memory 240 to be further processed by the DSP(s) 212 or the general purpose processor 211 in response to action from a user. Similarly, applications hosted on the mobile device 200 may store analog or digital signals on the memory 240 to present an output signal to a user. The mobile device 200 may optionally include a dedicated audio input/output (I/O) device 270 comprising, for example, a dedicated speaker, microphone, digital to analog circuitry, analog to digital circuitry, amplifiers and/or gain control. This is merely an example of how an audio I/O may be implemented in a mobile device, and claimed subject matter is not limited in this respect. The mobile device 200 may comprise touch sensors 262 responsive to touching or pressure on a keyboard or touch screen device.

The mobile device 200 may comprise a dedicated camera device 264 for capturing still or moving imagery. The camera device 264 may comprise, for example, an imaging sensor (e.g., charge coupled device or CMOS imager), lens, analog-to-digital circuitry, frame buffers, just to name a few examples. Additional processing, conditioning, encoding, and/or compression of signals representing captured images may be performed at the general purpose/application processor 211 and/or the DSP(s) 212. A dedicated video processor 268 may perform conditioning, encoding, compression or manipulation of signals representing captured images. A video processor 268 may decode/decompress stored image data for presentation on a display device (not shown) on the mobile device 200.

The mobile device 200 may also comprise sensors 260 coupled to the bus 201 which may include, for example, inertial sensors and environment sensors. Inertial sensors of the sensors 260 may comprise, for example, accelerometers (e.g., collectively responding to acceleration of the mobile device 200 in three dimensions), one or more gyroscopes or one or more magnetometers (e.g., to support one or more compass applications). Environment sensors of the mobile device 200 may comprise, for example, temperature sensors, barometric pressure sensors, ambient light sensors, camera imagers, microphones, just to name few examples. The sensors 260 may generate analog and/or digital signals that may be stored in the memory 240 and processed by the DPS(s) 212 or the general purpose application processor 211 in support of one or more applications such as, for example, applications directed to positioning or navigation operations.

The mobile device 200 may comprise a dedicated modem processor 266 capable of performing baseband processing of signals received and downconverted at the wireless transceiver 221 or the SPS receiver 255. The modem processor 266 may perform baseband processing of signals to be upconverted for transmission by the wireless transceiver 221. In alternative implementations, instead of having a dedicated modem processor, baseband processing may be performed by a general purpose processor or DSP (e.g., the general purpose/application processor 211 or the DSP(s) 212). These are merely examples of structures that may perform baseband processing, and claimed subject matter is not limited in this respect.

Figure 3:
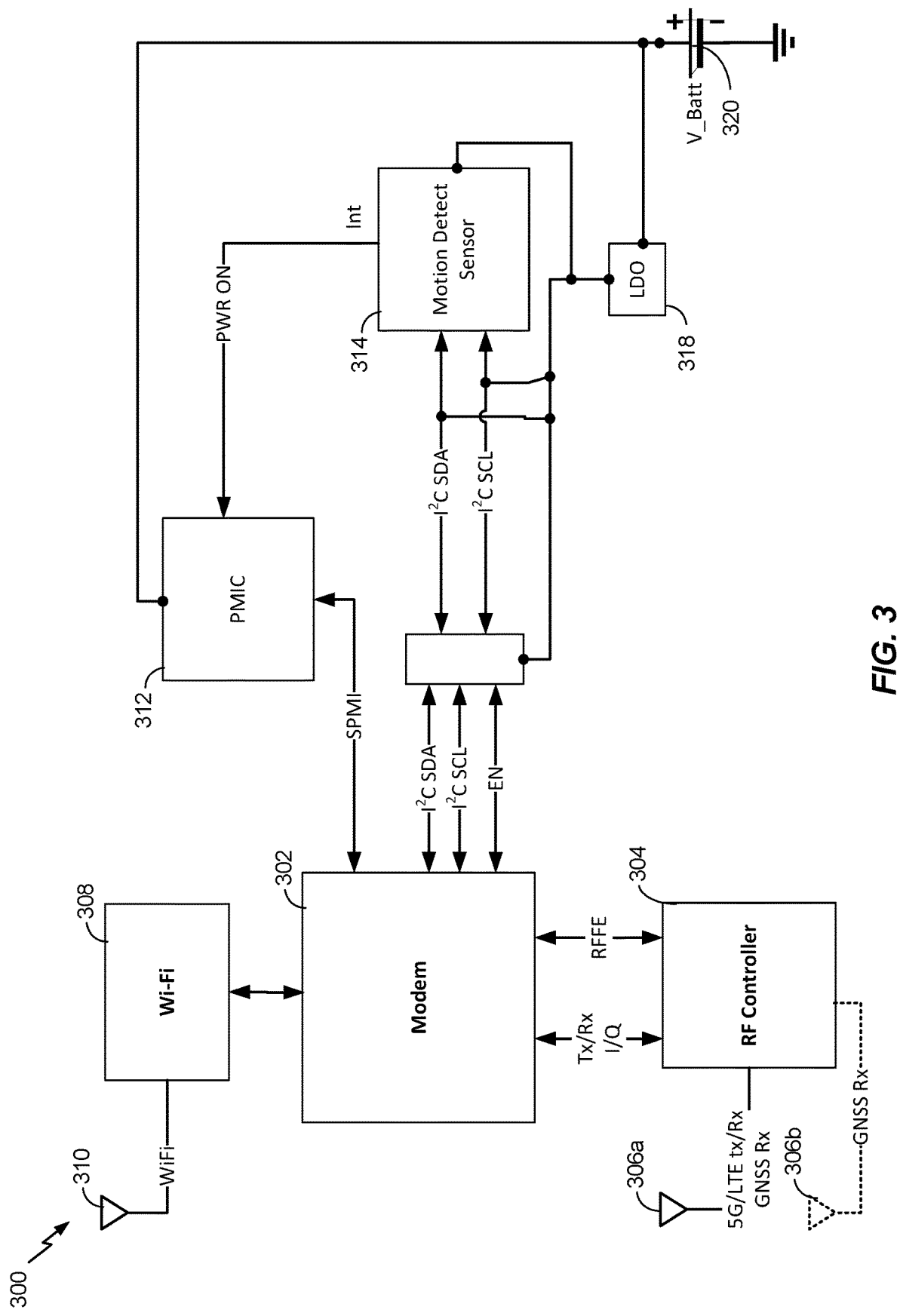
FIG. 3 is a hardware diagram for a subset of components in an example Internet of Things (IoT) device.

Referring to FIG. 3, a hardware diagram for an example IoT device 300 is shown. The IoT device is an example of type of mobile device 200. In general, and IoT device has the ability to connect with a wireless network and includes integrated technology such as sensors, functional software, technology to support networks connection, or actuators. As examples, and not limitations, IoT devices can be a myriad of products such as mobile devices, navigation systems, light actuators, parking meters, appliances, security systems, fire alarms, cameras, and more. In an example, the IoT device 300 may include a modem module 302, an Radio Frequency (RF) control module 304, an optional Wi-Fi module 308, a power management integrated circuit (PMIC) 312, and an external motion detect sensor 314. The modem module 302 may also be a device manager, and is an example of a modem processor 266 including at least one central processing unit (e.g., ARM Cortex A7), and configured as a multi-mode single chipset connectivity solution to support IoT applications such as asset trackers, health monitors, security systems, smart city sensors, smart meters, wearable trackers and other portable or moveable device utilizing wide-area connectivity in a small form factor and low-power requirements. In an example, the modem module 302 may be a Qualcomm 9205 chipset configured for voice services such as LTE Cat-M1 VoLTE over IMD, GSM CS voice, and advanced capabilities such as Cat-M1 with 2,984 max. UL TBS Rel.14, Cat-M1 VoLTE enhancements, Cat-NB2 with multi-carrier NPRACH and Paging, Cat-M1 coverage enhancements Mode B support, Cat-M1 with enhanced coverage restriction, Cat-M1 w/ HARQ-ACK bundling in HD-FDD mode, Cat-NB2 with larger TBS and 2 HARQ processes, Cat-M1 retuning to another narrowband region within 1 retuning symbol, Cat-NB2 Release Assistance Indication (RAI). The RF control module 304 is an example of a transceiver and may include components such as the wireless transceiver 221 and the SPS receiver 255. Other transceivers, or combinations of transmitters and receivers may also be used to receive terrestrial and satellite signals. The RF control module 304 may be software defined radio operably coupled to the modem module 302 and one or more antennas 306a, 306b. A radio frequency reference input (RFFE) and Tx/Rx I/Q channels may be utilized between the modem module 302 and the RF control module 304. The RF control module 304 may be configured for various cellular technologies such as, for example, Rel.12 EGPRS MSC12, Rel.14 LTE Cat-M1, Rel.14 LTE and Cat-NB2. As an example, and not a limitation, the modem module 302 and the RF control module 304 may support network protocols such as IPv4/IPv6 stack with TCP and UDP, PPP, SSL, DTSL, FTP, ping, HTTTP, MQTT, OMA Lightweight M2M, CoAP. The RF control module 304 may be configured to support terrestrial and satellite based positioning. For example, the RF control module 304 may be configured to receive GPS, GLONASS, Beidou, and Galileo satellite signals as well as cellular signals used in terrestrial navigation (e.g., measurement of RSSI, RTT, RSRP, RSRQ, TOA signals). In an example, the RF control module 304 may be a radio transceiver and front-end IC.

In an example, the subset of components may include an optional Wi-Fi module 308. The Wi-Fi module 308 is an example of a wireless transceiver 221. The Wi-Fi module 308 may be operably coupled to the modem module 302 and an antenna 310, and configured for single or dual-band connectivity for both 2.4 GHz and 5 Ghz applications. In an example, the Wi-Fi module 308 and modem 302 may be a UHF transceiver and modem configured for RTK and/or DGNSS applications. A power supply 320 and voltage regulator (e.g., low-drop out LDO regulator 318) may be used with resistor networks (not shown in FIG. 3) to provide power and biasing voltages to the hardware components. In an example, the power supply is in a range of 2.4V to 4.8V.

While the hardware components depicted in FIG. 3 are shown as discrete packages, more than one component may be integrated in a System On Chip (SoC) configuration. Further, more than one external motion detect sensor device may be used.

Other devices and chip sets may also be used in IoT networks. For example, an IoT device may include the ublox ZED-F9P module configured for concurrent reception of GPS, GLONASS, Galileo and BeiDou and capable of multi-band RTK. The specific hardware device manufacturers and part numbers provided herein are examples only, and not limitations, as the functionality of the components may be included in other proprietary and commercially available semiconductor chips sets.

Figure 4:
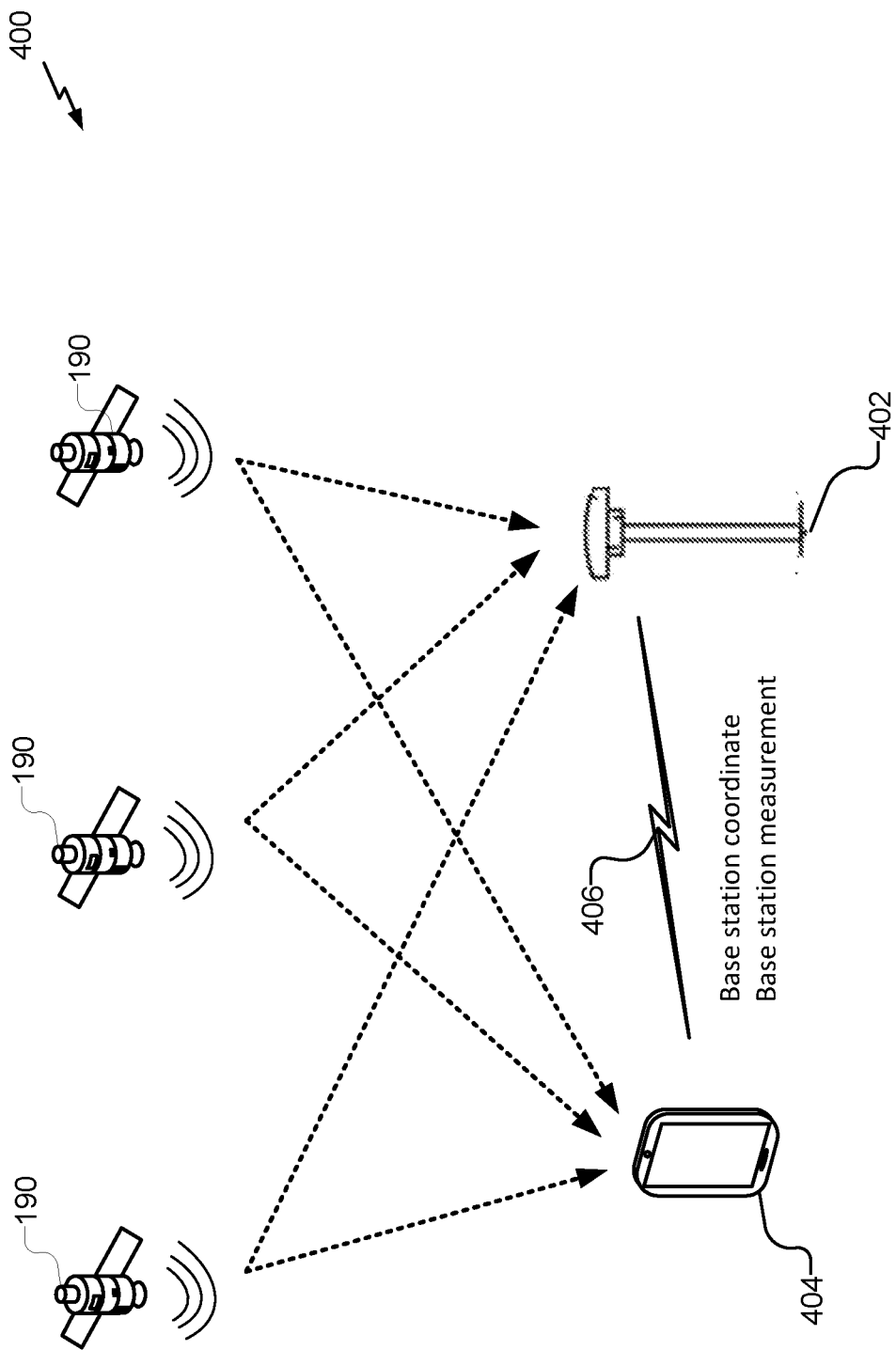
FIG. 4 is a conceptual diagram of an example RTK positioning system with a base station and a rover.

Referring to FIG. 4, an example RTK positioning system 400 with a base station 402 and a rover 404 is shown. The base station 402 may include a GNSS receiver configured to receive RF signals from a plurality of SVs 190, and a transceiver configured to communicate via a wireless link 406 with the rover 404. The rover 404 may be a mobile device such as the UE 105, the mobile device 200, the IoT device 300, or another navigation device with a GNSS receiver configured to receive RF signals from the plurality of SVs 190 and communicate with the base station 402 via the wireless link 406. In an embodiment, the base station 402 is configured to re-broadcast the phase of the carrier that it observes via the wireless link 406, and the rover 404 may be configured to compare its phase measurements with the one received by the base station 402. The wireless link 406 may utilize RTCM messaging in the UHF band. Other RATS such as Wi-Fi, Bluetooth, LTE, 5G, and communication protocols may also be used. The RTCM messaging may include coordinate information for the base station 402. In an example, the wireless link 406 may utilize different RTCM port streams for the same base station 402. The different RTCM port streams may include different coordinates for the base station 402 because each port stream may utilize different datum and epoch information. The motion of the base station 402 due to tectonic shifts over time may impact the accuracy of the base station coordinate information if the datum is based on an older epoch. For example, if the coordinates of the base station 402 are based on datum from a 5 year old epoch, the resulting RTK solution may include an additional 50 centimeters, or more, of error. The techniques provided herein enable a reduction of the position error in RTK and DGNSS systems caused by tectonic movement.

Figure 5:
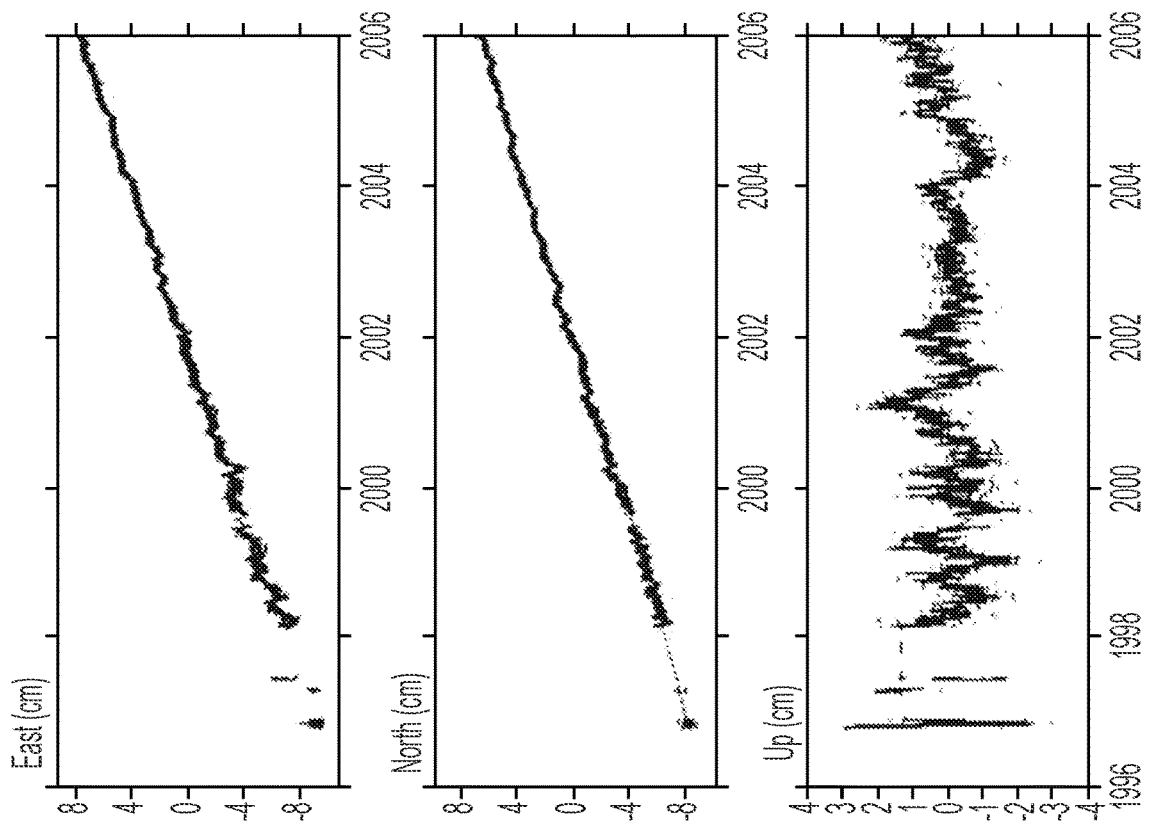
FIG. 5 includes diagrams of example horizontal velocity fields based on plate tectonic movement.
Figure 5:

Referring to FIG. 5, diagrams of example horizontal velocity fields based on plate tectonic movement are shown. The diagrams in FIG. 5 are based on the International Terrestrial Reference Frame (ITRF) 2014 modeled horizontal velocity fields (see Chris Rizos, Introduction to 3D Reference Frames/Datums, FIG/IAG/UN-GGIM-AP/UN-ICG/NZIS Technical Seminar Reference Frame in Practice Christchurch, New Zealand, 1-2 May 2016, and Zuheir Altamimi, Paul Rebischung, Laurent Métivier, and Xavier Collilieux, ITRF2014: A new release of the International Terrestrial Reference Frame modeling nonlinear station motions, JGR Solid Earth, July 2016). The implication of the horizontal motion is that even a static reference station is moving based on tectonic motion. The motion may be over 10 cm/yr. Thus, the coordinates of a base station measured 5 years ago could introduce an error of 50 cm in an RTK or DGNSS position solution. The tectonic models may be used to compute the reference station velocity and compensate for the impact of measurements obtained in older epochs.

Figure 6:
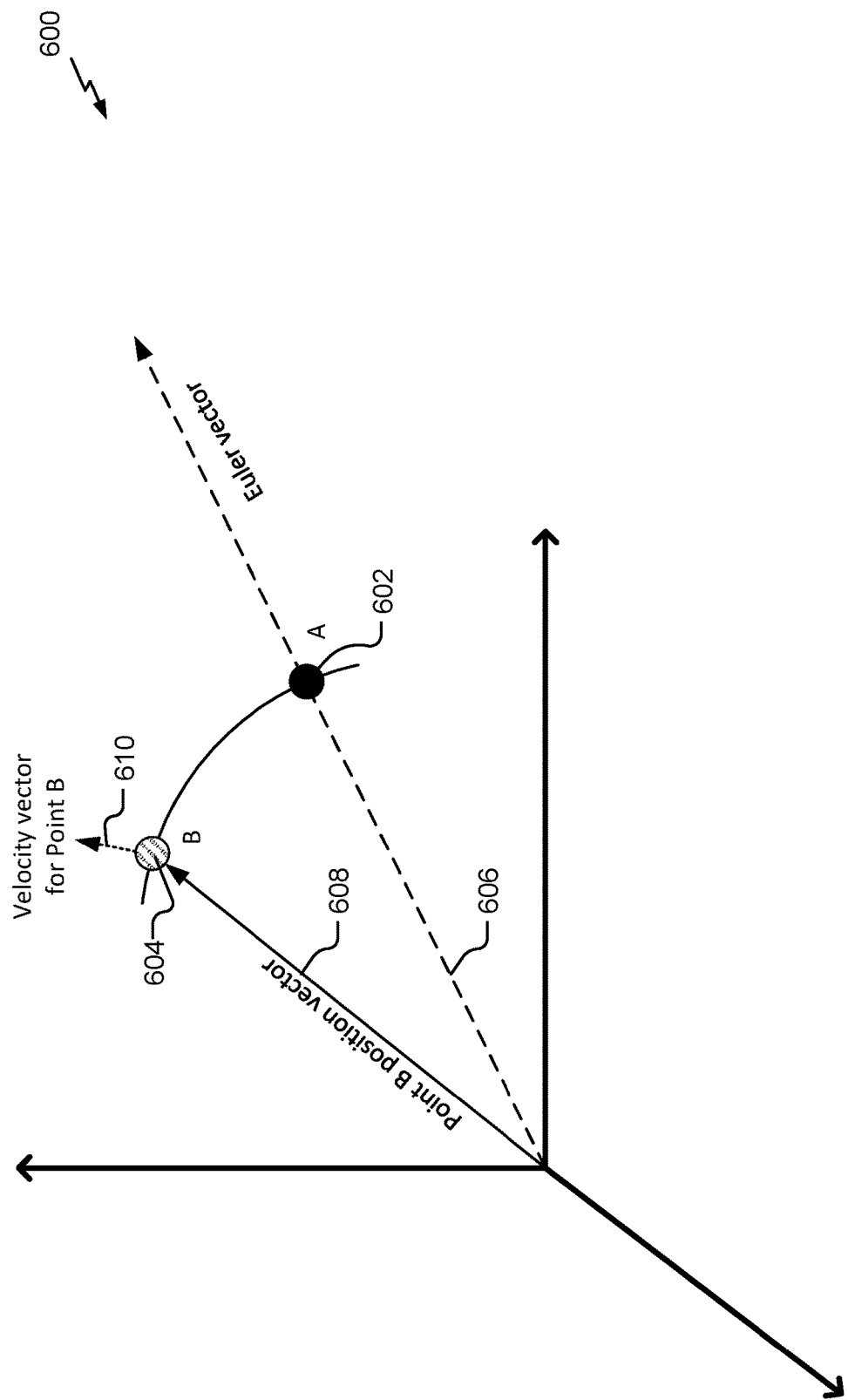
FIG. 6 is a vector diagram of an example model for determining a velocity vector for a point based on tectonic movement.

Different tectonic models are available and provide different rotation and pole information for the different tectonic plates. For example, models such as ITRF 2000, CGPS 2004, NUVEL 1, etc. may provide pole location and angular velocities for different plates (e.g., Australian, Antarctic, Eurasian, North American, South American, Pacific, etc.). The pole location and angular velocity information from the published models may be used to determine the horizontal displacement of a base station from a past epoch to the present. For example, referring to FIG. 6, a vector diagram 600 of an example model for determining a velocity vector for a point based on tectonic movement is shown (see Seth Stein and Michael Wysession, An Introduction to Seismology, Earthquakes, and Earth Structure, 2003, Blackwell Publishing). In an example, the model includes point 'A' 602 as the plate rotational pole location (i.e., obtained from a published model such as ITRF 2000), and point 'B' 604 as a point of interest location (i.e., the location of the base station 402). The point B position vector 'r' 608 may be computed as:

$$r = \begin{bmatrix} a*\cos(\phi_B)*\cos(\lambda_B) \\ a*\cos(\phi_B)*\sin(\lambda_B) \\ a*\sin(\phi_B) \end{bmatrix} \quad (1)$$

where,
a=earth radius;
$\phi_B$=point B latitude in radians; and
$\lambda_B$=point B longitude in radians.
An Euler vector 606 may be computed as:

$$V_{Euler} = \begin{bmatrix} \omega*\cos(\phi_A)*\cos(\lambda_A) \\ \omega*\cos(\phi_A)*\sin(\lambda_A) \\ \omega*\sin(\phi_A) \end{bmatrix} \quad (2)$$

where,
$\omega$=plate rotation angular velocity (radians/year);
$\phi_A$=point A latitude in radians; and
$\lambda_A$=point A longitude in radians.
A velocity vector 610 of point B 604 may be used to determine the change in coordinates of the base station 402 based on the epoch of the datum (i.e., the age of the datum). The velocity vector 610 at point B 604 may be computed in a cartesian coordinate as:

$$V_B = \begin{bmatrix} V_B^x \\ V_B^y \\ V_B^z \end{bmatrix} = \text{cross}(V_{Euler}, r) \quad (3)$$

where cross( ) is a vector cross product function.

In operation, the velocity vector 610 ($V_B$) may be expressed as centimeters/year and may be applied to datum of an epoch year to update the datum to the current year. In an embodiment, a service provider may be configured to broadcast epoch and station velocity information. For example, the base station 402 may be configured to provide coordinate and epoch information (i.e., the reference datum and the reference epoch) to the rover 404 via RTCM messages (e.g., RTCM 1005, 1006) and provide the base station velocity $V_B$ (i.e., the reference velocity) via non-RTCM messages to the rover 404. The position of the rover 404 may be based on the reference datum, the reference epoch and the reference velocity. In an embodiment, a service provider may broadcast epoch information, and a device may have plate tectonic models stored locally. For example, the base station 402 may be configured to provide coordinate and epoch information (i.e., the reference datum and the reference epoch) to the rover 404 via RTCM messages (e.g., RTCM 1005, 1006). The rover 404 may have tectonic model information stored locally (e.g., obtained from a network, a sidelink communication, or other out-of-band method) and may be configured to compute the base station velocity vector 610 as described in equations (1)-(3) above. For example, the tectonic model information may include the plate rotation pole location (i.e., point A 602) and angular velocity information (i.e., ω) based on the expected service area of the rover. The position of the rover 404 may then be computed based on the reference datum, the reference epoch and the locally computed reference velocity.

Figure 7:
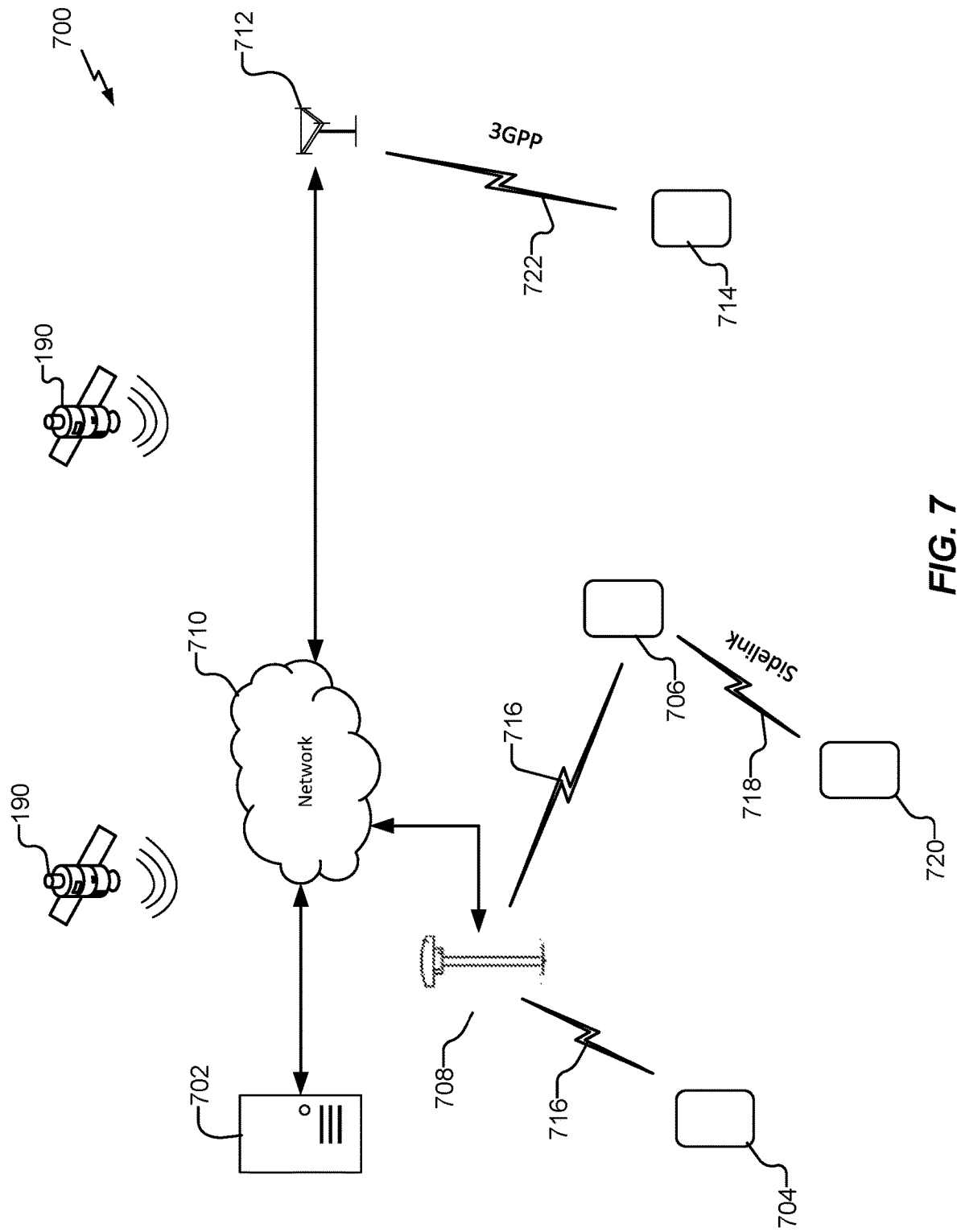
FIG. 7 is a conceptual diagram of example systems for providing base station velocity information to GNSS receivers.

Referring to FIG. 7, with further reference to FIGS. 1-6, a conceptual diagram 700 of example systems for providing base station velocity information to GNSS receivers is shown. The diagram 700 includes a server 702 operably connected to a network 710. The server 702 may be one or more edge network devices configured to provide plate tectonic model information to the network elements. The network 710 may include the communication system 100 and/or other wide area network components. In an example, the server 702 may be included in the communication system 100 (e.g., the LMF 120). The diagram 700 includes a first example base station 708 and a second example base station 712. The example base stations 708, 712 may be RTK/DGNSS base stations, WiFi access points, gNBs 110*a*-*b*, ng-eNB 114 and/or combinations of other public and proprietary networked wireless communication stations configured to provide base station information to roving navigation devices. In an V2X network, one or more of the base stations 708, 712 may be a Roadside Unit (RSU) configured to communicate with roving devices via a sidelink (e.g., PC5). In an example, the network 710 may include a connection to the Internet.

A first roving device 704 and a second roving device 706 (i.e., the rovers) may be a UE 105, a mobile device 200, an IoT device 300, or any other device with a GNSS receiver to receive signals from the SVs 190 and configured to participate in a RTK and/or DGNSS communication network. For example, one or more of the roving devices 704, 706 may be a mobile device operating with a subscription to a position correction service (e.g., PPP, DGNSS, RTK, Network RTK).

In operation, errors in satellite clocks, real orbits, and other sources may contribute to inaccuracies to GNSS signals by the time they reach a receiver. In an example, the locations of the base stations 708, 712 may be based on the results of a previous precise positioning process and based on coordinates associated with the epoch in which the location was obtained. In some cases, the location coordinates associated with the base stations 708, 712 may be many years old (e.g., 3, 5, 10, 20, etc.). Subsequent changes in the Earth's crust, such as tectonic shifts, may cause the positions of the base stations to move over time. The motion may be in the range of 10's of centimeters per year. Positioning errors may occur when a roving station, such as the first and second roving devices 704, 706 utilize SV measurements from an epoch that is different from the epoch in which the location of the corresponding base station was established. In this case, the base stations and/or the roving stations in a network may be configured to update the location of the base station based on publicly available tectonic models. The tectonic models may, for example, be stored on a network resource such as the server 702 and available to the base stations 708, 712 and/or the roving devices 704, 708 (e.g., via the network 710).

In an embodiment, the base stations 708, 712 may be configured to broadcast epoch and station velocity information. For example, the first base station 708 may be configured to provide coordinate and epoch information including the base station velocity Vs (i.e., the reference datum, the reference epoch, and the reference velocity) to the first and second rovers 704, 708 via one or more messages over a communication link 716 (e.g., RTCM and non-RTCM formats). The communication link 716 may be a UHF link, or other wireless technology such as Wi-Fi, Bluetooth, or cellular based technologies. For example, the second base station 712 may be a gNB and a third rover 714 may be configured to receive the coordinate and epoch information via a cellular link 722 such as LTE or 5G-NR RATs. The respective positions of the rovers 704, 706, 714 may be based on the reference datum, the reference epoch and the reference velocity.

In an embodiment, the base stations 708, 712 may broadcast epoch information, and the rovers 704, 706, 714 may have plate tectonic model information stored locally. For example, the base stations 708, 712 may be configured to provide coordinate and epoch information (i.e., the reference datum and the reference epoch) to the rovers 704, 706, 714 via the communication link 716 and/or the cellular link 722. The communication link 716 may include RTCM messages (e.g., RTCM 1005, 1006). The rovers 704, 706, 714 may have tectonic model information stored locally (e.g., obtained from a network, a sidelink communication, or other out-of-band method) and may be configured to compute the base station velocity vector 610 as described in equations (1)-(3) above. For example, the tectonic model information may include the plate rotation pole location (i.e., point A 602) and angular velocity information (i.e., ω) based on the expected service area of the rover. The position of the respective rovers 704, 706, 714 may then be computed based on the reference datum, the reference epoch and the locally computed reference velocity.

In an embodiment, one or more of the rovers 704, 706, 714 may be configured to communicate with other roving devices via a peer-to-peer communication protocol such as 5G NR sidelink and V2X PC5 protocols. For example, the second rover 706 may utilize a sidelink 718 to provide coordinate and epoch information (including base station velocity information) to a fourth rover 720. In an example, the use of sidelinks may be used to extend the range of the base stations 708, 712 since the base station coordinate and measurement information may be forwarded through multiple rovers.

Figure 8:
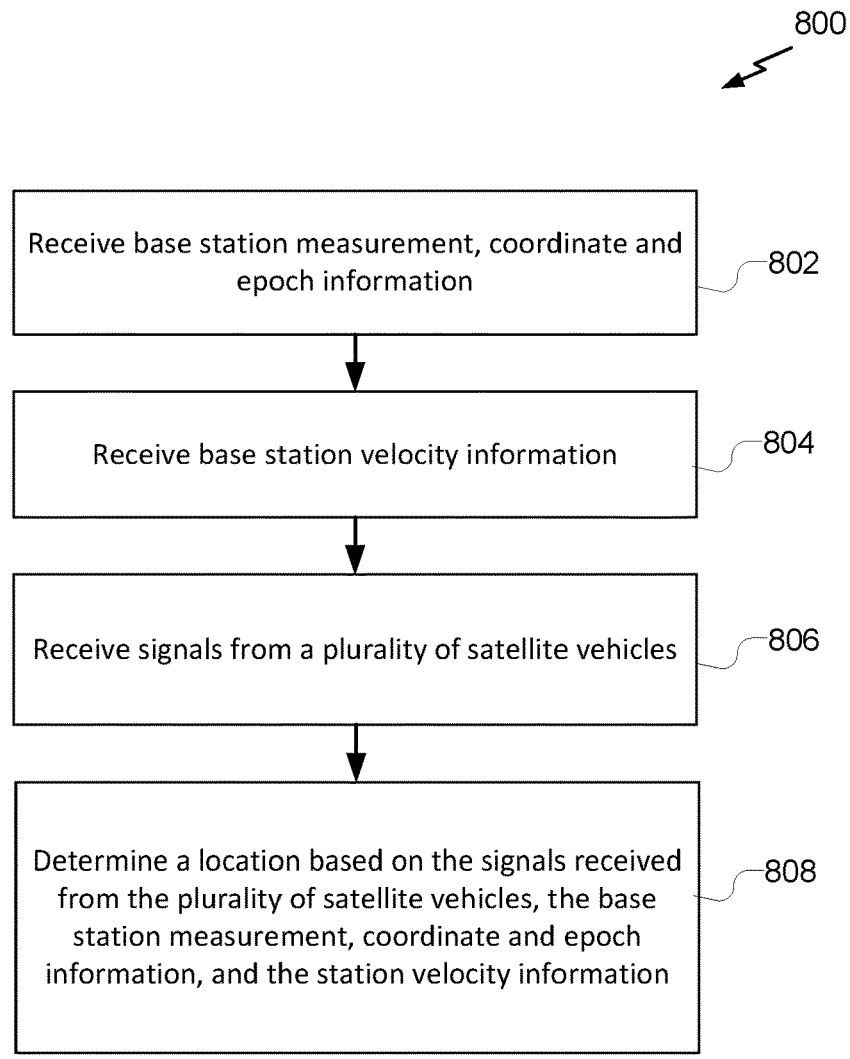
FIG. 8 is a flowchart of an example method for determining a location of a mobile device based at least in part on received station velocity information.

Referring to FIG. 8, with further reference to FIGS. 1-7, a method 800 for determining a location of a mobile device based at least in part on received station velocity information includes the stages shown. The method 800 is, however, an example only and not limiting. The method 800 may be altered, e.g., by having stages added, removed, rearranged, combined, performed concurrently, and/or having single stages split into multiple stages.

At stage 802, the method includes receiving base station measurement, coordinate and epoch information. A mobile device 200 and IoT device 300 are means for receiving base station information. A rover device in a RTK or DGNSS system may receive one or more messages from a base station. The coordinate information may be based on a measured location of the base station and the epoch information may indicate the year the measurements were obtained. In an example, the base station 708 may transmit the measurement, coordinate and epoch information to the rover 704 via one or more RTCM messages (e.g., RTCM 1005, 1006). Other wireless technologies and protocols may also be utilized by a rover to receive base station measurement, coordinate and epoch information. As an example, and not a limitation, in an V2X network, a RSU may be configured as a base station and a mobile device, such as the mobile device 200, may receive the base station measurement, coordinate and epoch information via a sidelink such as PC5.

At stage 804, the method includes receiving base station velocity information. The mobile device 200 and the IoT device 300 are means for receiving the base station velocity information. In an embodiment, the base station 708 may be configured to compute a base station velocity based on published tectonic models such as ITRF 2000, CGPS 2004, NUVEL 1, etc. The models may be stored locally on the base station 708, or may persist on a networked server or web service such as the server 702. The models may provide pole location and angular velocities for different plates (e.g., Australian, Antarctic, Eurasian, North American, South American, Pacific, etc.), and the pole location and angular velocity information may be used to determine the horizontal displacement of a base station from a past epoch to the present as described in equations (1)-(3). The rover device in the RTK or DGNSS system may receive one or more RTCM or non-RTCM messages with the base station velocity information and may update the base station coordinates received at stage 802 based on the epoch information. In an embodiment, the base station may be configured to update the coordinate information prior to transmitting them in stage 802. That is, the RTCM messages received at stage 802 may include the updated coordinates based on the velocity information.

At stage 806, the method includes receiving signals from a plurality of satellite vehicles (SVs). The mobile device 200 and the IoT device 300 are means for receiving signals from the plurality of SVs. For example, the SVs 190 may be configured to transmit GPS signals including a Pseudo Random Code (PRC), and a GPS receiver in the rover 704 is configured to receive the PRC from multiple SVs. The GPS receiver is configured to align the received code to its own and calculate the propagation delay. The GPS receiver also knows the position of the satellite and can calculate the distance to the satellite. Once the receiver knows its distance (range) from four satellites, for example, it may determine its 3-dimensional position. Other GNSS signals and positioning techniques may also be used.

At stage 808, the method includes determining a location based on the signals received from the plurality of satellite vehicles, the base station measurement, coordinate and epoch information, and the station velocity information. The mobile device 200 and the IoT device 300 are means for determining a location. The rovers 704, 706, 714 and base stations 708, 712 in RTK systems may utilize carrier-based ranging to determine the location. For example, a range may be calculated by determining the number of carrier cycles between a GPS receiver and satellite and then multiplied by the wavelength of the carrier signal. After applying the differential correction from base stations, the errors of orbit, clock and atmospheric delays are effectively removed. The positions of the base stations are known based on the coordinate and epoch information received at stage 802, and are updated with the base station velocity information received at stage 804. The measurement information provided by a base station in a DGNSS system may be based on a comparison of the updated position with a position calculated by the GNSS signal. The difference between the updated known position and the GNSS calculated position is transmitted to the rovers, which may use the correction to calculate their respective positions. The measurement information provided by a base station in a RTK system may be the phase of the signal that the base station observes. The RTK base station may send that measurement information to the rovers, which may compare the measurement information to the phase that they observe and determine the location based on the comparison of the updated base station position.

Figure 9:
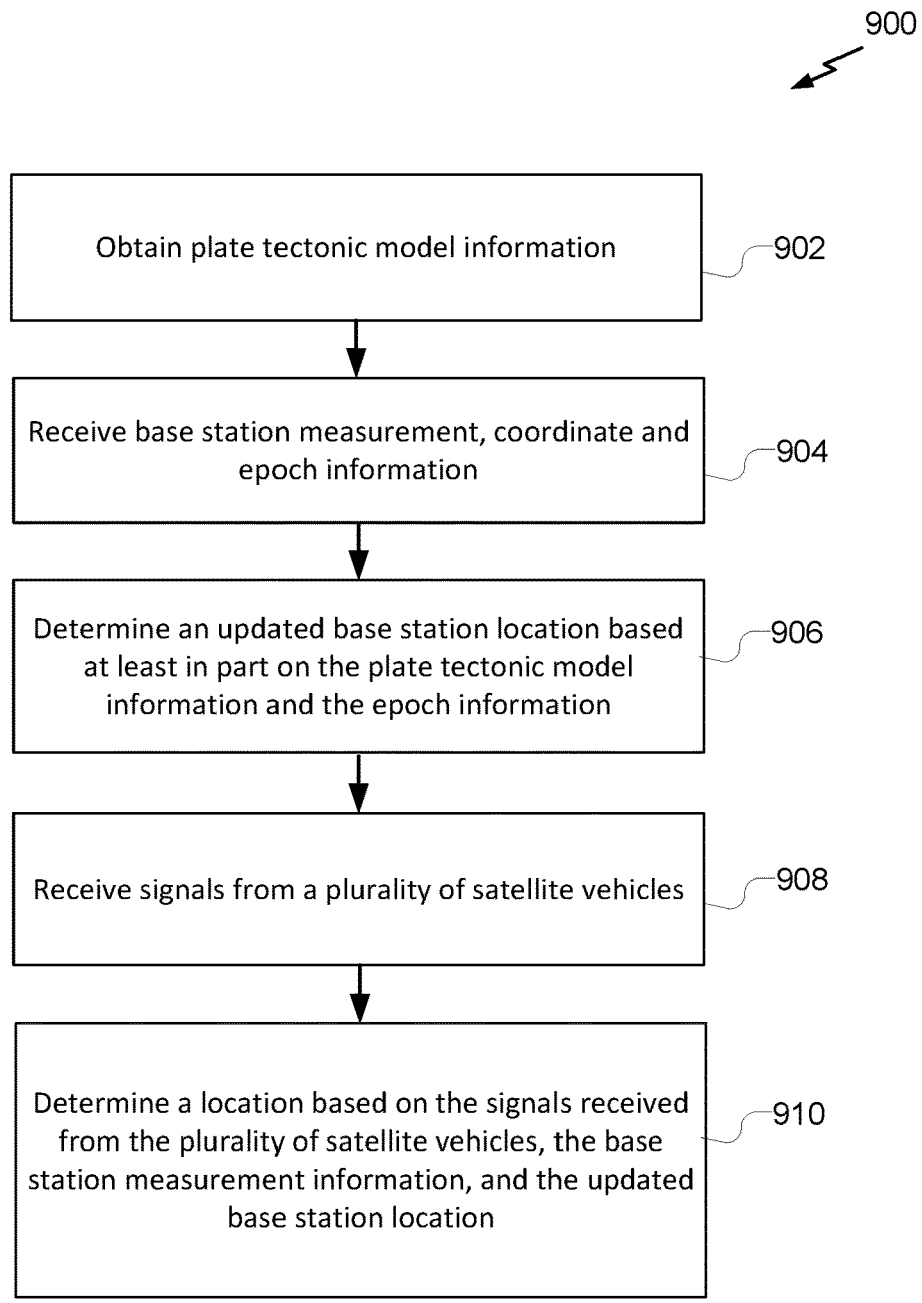
FIG. 9 is a flowchart of an example method for determining a location of a mobile device based at least in part on received tectonic model information.

Referring to FIG. 9, with further reference to FIGS. 1-7, a method 900 for determining a location of a mobile device based at least in part on computed station velocity information includes the stages shown. The method 900 is, however, an example only and not limiting. The method 900 may be altered, e.g., by having stages added, removed, rearranged, combined, performed concurrently, and/or having single stages split into multiple stages.

At stage 902, the method includes obtaining plate tectonic model information. A roving device such as the mobile device 200 and the IoT device 300 are means for obtaining the plate tectonic model information. In an example, a networked server such as the server 702 may include published tectonic models such as ITRF 2000, CGPS 2004, NUVEL 1, etc. The models may provide pole location and angular velocities for different plates (e.g., Australian, Antarctic, Eurasian, North American, South American, Pacific, etc.), and the pole location and angular velocity information may be used to determine the horizontal displacement of a base station from a past epoch to the present as described in equations (1)-(3). The roving device may be configured to obtain the model information via the network 710 through an access point or base station through various wired and wireless connections such as Wi-Fi, Bluetooth, cellular connections (e.g., LTE, 5G-NR), etc. In an embodiment, the model information may be stored in a local memory of the roving device and may be accessed as required by a navigation application.

At stage 904, the method includes receiving base station measurement, coordinate and epoch information. The roving device such as the mobile device 200 and the IoT device 300 are means for receiving the base station information. A rover device in a RTK or DGNSS system may receive one or more messages from a base station. The coordinate information may be based on a measured location of the base station and the epoch information may indicate the year the measurements were obtained. In an example, the base station 708 may transmit the measurement, coordinate and epoch information to the rover 704 via one or more RTCM messages (e.g., RTCM 1005, 1006). Other wireless technologies and protocols may also be utilized by a rover to receive base station measurement, coordinate and epoch information. As an example, and not a limitation, in a 5G-NR network, a gNB may be configured as a RTK or DGNSS base station and a mobile device, such as the mobile device 200, may receive the base station measurement, coordinate and epoch information via LPP or Radio Resource Control (RRC) messages.

At stage 906 the method includes determining an updated base station location based at least in part on the plate tectonic model information and the epoch information. The roving device such as the mobile device 200 and the IoT device 300 are means for determining the updated base station location. In an embodiment, the rover may be configured to utilize the pole location and angular velocity information obtained from the tectonic model information at stage 902 with the coordinate and epoch information received at stage 904 to determine the horizontal displacement of a base station from a past epoch to the present as previously described in equations (1)-(3).

At stage 908, the method includes receiving signals from a plurality of satellite vehicles (SVs). A rover such as the mobile device 200 and the IoT device 300 are means for receiving signals from the plurality of SVs. For example, the SVs 190 may be configured to transmit GPS signals including a PRC, and a GPS receiver in the rover is configured to receive the PRC from multiple SVs. The GPS receiver is configured to align the received code to its own and calculate the propagation delay. The GPS receiver also knows the position of the satellite and can calculate the distance to the satellite. Once the receiver knows its distance (range) from four satellites, for example, it may determine its 3-dimensional position. Other GNSS signals and positioning techniques may also be used.

At stage 910, the method includes determining a location based on the signals received from the plurality of satellite vehicles, the base station measurement information, and the updated base station location. The mobile device 200 and the IoT device 300 are means for determining a location. The measurement information provided by a base station in a DGNSS system may be based on a comparison of the updated base station location with a position calculated by GNSS signals received by the base station. The difference between the updated base station location and the GNSS calculated location are then transmitted to the rovers, which may use the correction to calculate their respective positions. The measurement information provided by a base station in a RTK system may be the phase of the signal that the base station observes.

Figure 10:
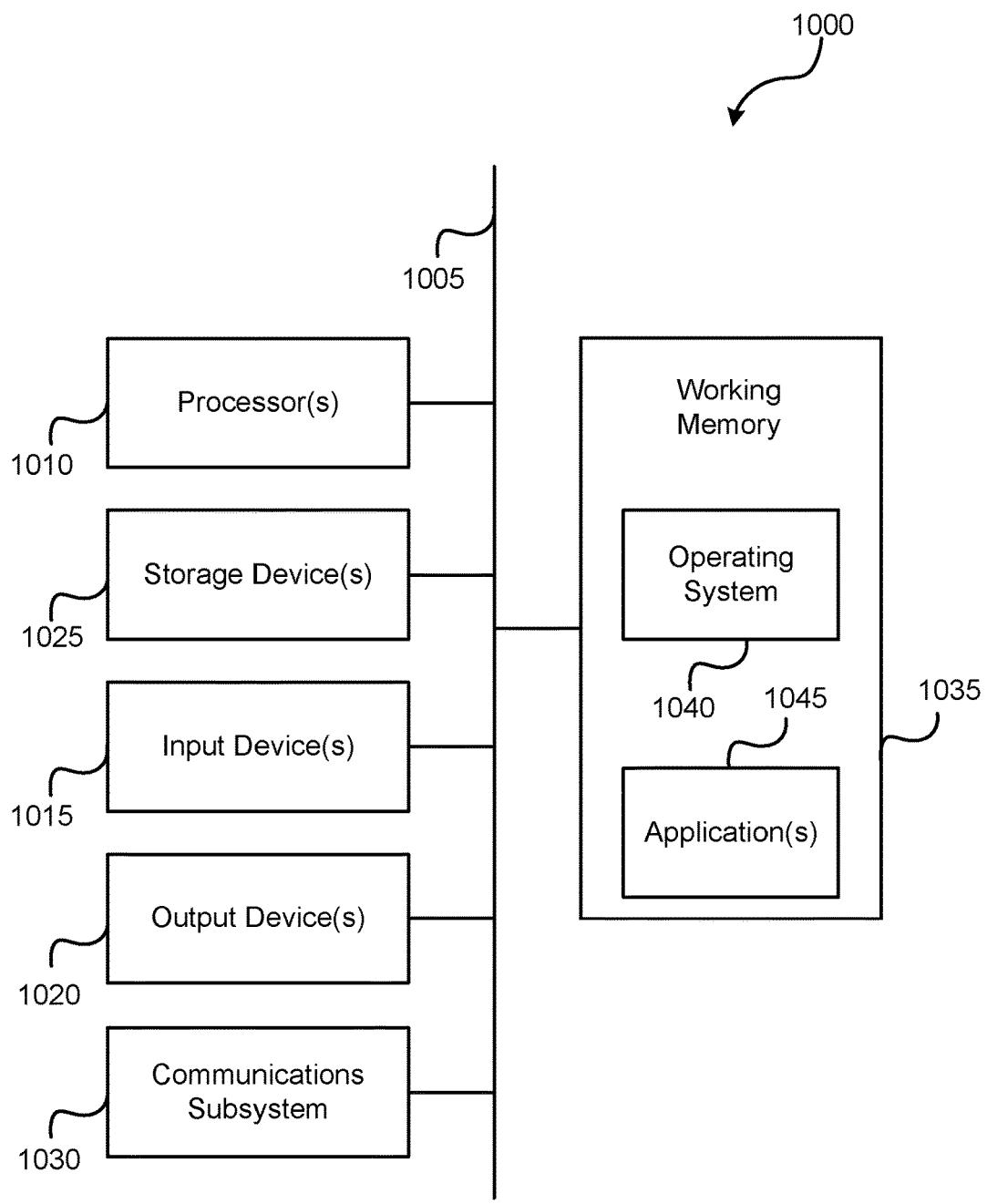
FIG. 10 illustrates a block diagram of an example of a computer system.

A computer system as illustrated in FIG. 10 may incorporate as part of the previously described computerized devices such as the server 702 and the base stations 708, 712. FIG. 10 provides a schematic illustration of one embodiment of a computer system 1000 that can perform the methods provided by various other embodiments, as described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard and/or the like; and one or more output devices 1020, which can include without limitation a display device, a printer and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth device, an 802.11 device, a Wi-Fi device, a WiMax device, cellular communication facilities, UHF based networks, etc.), and/or the like. The communications subsystem 1030 may permit data to be exchanged with a network (such as the network 710, to name one example), other computer systems, and/or any other devices described herein. In many embodiments, the computer system 1000 will further comprise a working memory 1035, which can include a RANI or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1025 described above. In some cases, the storage medium might be incorporated within a computer system, such as the system 1000. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the disclosure. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1025. Volatile media include, without limitation, dynamic memory, such as the working memory 1035. Transmission media include, without limitation, coaxial cables, copper wire and fiber optics, including the wires that comprise the bus 1005, as well as the various components of the communication subsystem 1030 (and/or the media by which the communications subsystem 1030 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various embodiments and aspects of the disclosure.

The communications subsystem 1030 (and/or components thereof) generally will receive the signals, and the bus 1005 then might carry the signals (and/or the data, instructions, etc. carried by the signals) to the working memory 1035, from which the processor(s) 1005 retrieves and executes the instructions. The instructions received by the working memory 1035 may optionally be stored on a storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims. Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for determining a location of a mobile device, comprising:
receiving base station measurement, coordinate and epoch information;
receiving base station velocity information;
receiving signals from a plurality of satellite vehicles; and
determining the location of the mobile device based on the signals received from the plurality of satellite vehicles, the base station measurement, coordinate and epoch information, and the base station velocity information.

2. The method of clause 1 wherein the base station velocity information is based at least in part on a pole location and an angular velocity obtained from a plate tectonic model.

3. The method of either of clauses 1 and 2 wherein the base station measurement, coordinate and epoch information are included in one or more Radio Technical Commission for Maritime (RTCM) messages in a RTCM port stream.

4. The method of any of clauses 1-3 wherein the base station velocity information is included in a Radio Technical Commission for Maritime (RTCM) message.

5. The method of any of the clauses 1-4 wherein the base station velocity information is received from a server.

6. The method of any of the clauses 1-4 wherein the base station velocity information is received from a base station in a Real-Time Kinematic (RTK) positioning system.

7. The method of any of the clauses 1-4 wherein the base station velocity information is received from a base station in a Differential Global Navigation Satellite System (DGNSS).

8. The method of any of the clauses 1-8 wherein at least one of the base station measurement, coordinate information, epoch information, the base station velocity information, or any combinations thereof are received from a user equipment via a sidelink communication protocol.

9. The method of any of the clauses 1-9 wherein at least one of the base station measurement, coordinate information, epoch information, the base station velocity information, or any combinations thereof are received from a base station via a cellular radio access technology.

10. The method of any of the clauses 1-9 wherein the signals from the plurality of satellite vehicles are global positioning system signals.

11. A method for determining a location of a mobile device, comprising:
obtaining plate tectonic model information;
receiving base station measurement, coordinate and epoch information;
determining an updated base station location based at least in part on the plate tectonic model information and the epoch information;
receiving signals from a plurality of satellite vehicles; and
determining the location of the mobile device based on the signals received from the plurality of satellite vehicles, the base station measurement information, and the updated base station location.

12. The method of clause 11 wherein the plate tectonic model information includes at least a pole location and an angular velocity.

13. The method of either clause 11 or 12 wherein the base station measurement, coordinate and epoch information are included in one or more Radio Technical Commission for Maritime (RTCM) messages in a RTCM port stream.

14. The method of any of the clauses 11-13 wherein the plate tectonic model information is included in a Radio Technical Commission for Maritime (RTCM) message.

15. The method of any of the clauses 11-14 wherein the plate tectonic model information is received from a server.

16. The method of any of the clauses 11-14 wherein the plate tectonic model information is received from a base station in a Real-Time Kinematic (RTK) positioning system.

17. The method of any of the clauses 11-14 wherein the plate tectonic model information is received from a base station in a Differential Global Navigation Satellite System (DGNSS).

18. The method of any of the clauses 11-17 wherein at least one of the base station measurement, coordinate information, epoch information, the plate tectonic model information, or any combinations thereof are received from a user equipment via a sidelink communication protocol.

19. The method of any of the clauses 11-18 wherein at least one of the base station measurement, coordinate information, epoch information, the plate tectonic model information, or any combinations thereof are received from a base station via a cellular radio access technology.

20. The method of any of the clauses 11-19 wherein the signals from the plurality of satellite vehicles are global positioning system signals.

21. An apparatus, comprising:
a memory;
at least one transceiver;
at least one processor communicatively coupled to the memory and the at least one transceiver, and configured to:
receive base station measurement, coordinate and epoch information;
receive base station velocity information;
receive signals from a plurality of satellite vehicles; and
determine a location of the apparatus based on the signals received from the plurality of satellite vehicles, the base station measurement, coordinate and epoch information, and the base station velocity information.

22. The apparatus of clause 21 wherein the base station velocity information is based at least in part on a pole location and an angular velocity obtained from a plate tectonic model.

23. The apparatus of either clause 21 or 22 wherein the base station velocity information is included in a Radio Technical Commission for Maritime (RTCM) message.

24. The apparatus of any of the clauses 21-23 wherein the base station velocity information is received from a server.

25. The apparatus of any of the clauses 21-24 wherein at least one of the base station measurement, coordinate information, epoch information, the base station velocity information, or any combinations thereof are received from a user equipment via a sidelink communication protocol.

26. An apparatus, comprising:
a memory;
at least one transceiver;
at least one processor communicatively coupled to the memory and the at least one transceiver, and configured to:
obtain plate tectonic model information;
receive base station measurement, coordinate and epoch information;
determine an updated base station location based at least in part on the plate tectonic model information and the epoch information;
receive signals from a plurality of satellite vehicles; and
determine a location of the apparatus based on the signals received from the plurality of satellite vehicles, the base station measurement information, and the updated base station location.

27. The apparatus of clause 26 wherein the plate tectonic model information includes at least a pole location and an angular velocity.

28. The apparatus of either clause 26 or 27 wherein the plate tectonic model information is included in a Radio Technical Commission for Maritime (RTCM) message.

29. The apparatus of any of the clauses 26-28 wherein the plate tectonic model information is received from a server.

30. The apparatus of any of the clauses 26-29 wherein at least one of the base station measurement, coordinate information, epoch information, the plate tectonic model information, or any combinations thereof are received from a user equipment via a sidelink communication protocol.

31. An apparatus for determining a location of a mobile device, comprising:
means for receiving base station measurement, coordinate and epoch information;
means for receiving base station velocity information;
means for receiving signals from a plurality of satellite vehicles; and
means determining the location of the mobile device based on the signals received from the plurality of satellite vehicles, the base station measurement, coordinate and epoch information, and the base station velocity information.

32. An apparatus for determining a location of a mobile device, comprising:
means for obtaining plate tectonic model information;
means for receiving base station measurement, coordinate and epoch information;
means for determining an updated base station location based at least in part on the plate tectonic model information and the epoch information;
means for receiving signals from a plurality of satellite vehicles; and
means for determining the location of the mobile device based on the signals received from the plurality of satellite vehicles, the base station measurement information, and the updated base station location.

33. A non-transitory processor-readable storage medium comprising processor-readable instructions to cause one or more processors to determine a location of a mobile device, comprising:
code for receiving base station measurement, coordinate and epoch information;
code for receiving base station velocity information;
code for receiving signals from a plurality of satellite vehicles; and
code for determining the location of the mobile device based on the signals received from the plurality of satellite vehicles, the base station measurement, coordinate and epoch information, and the base station velocity information.

34. A non-transitory processor-readable storage medium comprising processor-readable instructions to cause one or more processors to determine a location of a mobile device, comprising:
code for obtaining plate tectonic model information;
code for receiving base station measurement, coordinate and epoch information;
code for determining an updated base station location based at least in part on the plate tectonic model information and the epoch information;
code for receiving signals from a plurality of satellite vehicles; and
code for determining the location of the mobile device based on the signals received from the plurality of satellite vehicles, the base station measurement information, and the updated base station location.

What is claimed is:

1. A method for determining a location of a mobile device, comprising:
receiving base station measurement, coordinate and epoch information, wherein the base station measurement, coordinate and epoch information are included in one or more Radio Technical Commission for Maritime (RTCM) messages in a RTCM port stream;
receiving base station velocity information;
receiving signals from a plurality of satellite vehicles; and
determining the location of the mobile device based on the signals received from the plurality of satellite vehicles, the base station measurement, coordinate and epoch information, and the base station velocity information.

2. The method of claim 1 wherein the base station velocity information is based at least in part on a pole location and an angular velocity obtained from a plate tectonic model.

3. The method of claim 1 wherein the base station velocity information is included in a Radio Technical Commission for Maritime (RTCM) message.

4. The method of claim 1 wherein the base station velocity information is received from a server.

5. The method of claim 1 wherein the base station velocity information is received from a base station in a Real-Time Kinematic (RTK) positioning system.

6. The method of claim 1 wherein the base station velocity information is received from a base station in a Differential Global Navigation Satellite System (DGNSS).

7. The method of claim 1 wherein at least one of the base station measurement, coordinate information, epoch information, the base station velocity information, or any combinations thereof are received from a user equipment via a sidelink communication protocol.

8. The method of claim 1 wherein at least one of the base station measurement, coordinate information, epoch information, the base station velocity information, or any combinations thereof are received from a base station via a cellular radio access technology.

9. The method of claim 1 wherein the signals from the plurality of satellite vehicles are global positioning system signals.

10. A method for determining a location of a mobile device, comprising:
obtaining plate tectonic model information;
receiving base station measurement, coordinate and epoch information, wherein the base station measurement, coordinate and epoch information are included in one or more Radio Technical Commission for Maritime (RTCM) messages in a RTCM port stream;
determining an updated base station location based at least in part on the plate tectonic model information and the epoch information;
receiving signals from a plurality of satellite vehicles; and
determining the location of the mobile device based on the signals received from the plurality of satellite vehicles, the base station measurement information, and the updated base station location.

11. The method of claim 10 wherein the plate tectonic model information includes at least a pole location and an angular velocity.

12. The method of claim 10 wherein the plate tectonic model information is included in a Radio Technical Commission for Maritime (RTCM) message.

13. The method of claim 10 wherein the plate tectonic model information is received from a server.

14. The method of claim 10 wherein the plate tectonic model information is received from a base station in a Real-Time Kinematic (RTK) positioning system.

15. The method of claim 10 wherein the plate tectonic model information is received from a base station in a Differential Global Navigation Satellite System (DGNSS).

16. The method of claim 10 wherein at least one of the base station measurement, coordinate information, epoch information, the plate tectonic model information, or any combinations thereof are received from a user equipment via a sidelink communication protocol.

17. The method of claim 10 wherein at least one of the base station measurement, coordinate information, epoch information, the plate tectonic model information, or any combinations thereof are received from a base station via a cellular radio access technology.

18. The method of claim 10 wherein the signals from the plurality of satellite vehicles are global positioning system signals.

19. An apparatus, comprising:
a memory;
at least one transceiver;
at least one processor communicatively coupled to the memory and the at least one transceiver, and configured to:
receive base station measurement, coordinate and epoch information;
receive base station velocity information;
receive signals from a plurality of satellite vehicles; and
determine a location of the apparatus based on the signals received from the plurality of satellite vehicles, the base station measurement, coordinate and epoch information, and the base station velocity information.

20. The apparatus of claim 19 wherein the base station velocity information is based at least in part on a pole location and an angular velocity obtained from a plate tectonic model.

21. The apparatus of claim 19 wherein the base station velocity information is included in a Radio Technical Commission for Maritime (RTCM) message.

22. The apparatus of claim 19 wherein the base station velocity information is received from a server.

23. The apparatus of claim 19 wherein at least one of the base station measurement, coordinate information, epoch information, the base station velocity information, or any combinations thereof are received from a user equipment via a sidelink communication protocol.

24. An apparatus, comprising:
a memory;
at least one transceiver;
at least one processor communicatively coupled to the memory and the at least one transceiver, and configured to:
  obtain plate tectonic model information;
  receive base station measurement, coordinate and epoch information;
  determine an updated base station location based at least in part on the plate tectonic model information and the epoch information;
  receive signals from a plurality of satellite vehicles; and
  determine a location of the apparatus based on the signals received from the plurality of satellite vehicles, the base station measurement information, and the updated base station location.

25. The apparatus of claim 24 wherein the plate tectonic model information includes at least a pole location and an angular velocity.

26. The apparatus of claim 24 wherein the plate tectonic model information is included in a Radio Technical Commission for Maritime (RTCM) message.

27. The apparatus of claim 24 wherein the plate tectonic model information is received from a server.

28. The apparatus of claim 24 wherein at least one of the base station measurement, coordinate information, epoch information, the plate tectonic model information, or any combinations thereof are received from a user equipment via a sidelink communication protocol.

* * * * *